United States Patent
Dicker et al.

(12) 
(10) Patent No.: US 6,625,466 B1
(45) Date of Patent: Sep. 23, 2003

(54) METHOD AND SYSTEM FOR REGULATING THE TRANSMISSION POWER OF A MOBILE STATION OF A MOBILE RADIOTELEPHONE SYSTEM

(75) Inventors: Olaf Dicker, Rees (DE); Jürgen Kockmann, Gronau-Epe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/719,441

(22) PCT Filed: Jun. 16, 1999

(86) PCT No.: PCT/DE99/01767

§ 371 (c)(1),
(2), (4) Date: Dec. 12, 2000

(87) PCT Pub. No.: WO99/66656

PCT Pub. Date: Dec. 23, 1999

(30) Foreign Application Priority Data

Jun. 17, 1998 (DE) .......................................... 198 27 023

(51) Int. Cl.⁷ ................................................. H04Q 7/00
(52) U.S. Cl. ........................... 455/522; 455/69; 455/68; 455/70
(58) Field of Search ............................ 455/522, 69, 68, 455/70; 370/321, 254, 337; 375/219, 133

(56) References Cited

U.S. PATENT DOCUMENTS

| | | | |
|---|---|---|---|
| 5,459,760 A | 10/1995 | Watanabe | |
| 5,528,623 A | 6/1996 | Foster, Jr. | |
| 5,802,110 A | 9/1998 | Watanabe et al. | |
| 5,887,023 A * | 3/1999 | Mabuchi ..................... | 375/133 |
| 5,956,329 A * | 9/1999 | Pernice et al. .............. | 370/336 |
| 6,226,526 B1 * | 5/2001 | Sakoda et al. .............. | 455/557 |
| 6,519,236 B1 * | 2/2003 | Haartsen et al. ............ | 370/332 |

FOREIGN PATENT DOCUMENTS

| | | |
|---|---|---|
| DE | 44 26 255 A1 | 2/1996 |
| DE | 42 91 712 C1 | 8/1996 |
| DE | 197 25 438 A1 | 12/1997 |
| EP | 0 652 648 A1 | 5/1995 |
| EP | 0 668 665 A1 | 8/1995 |
| EP | 0847 147 A2 | 6/1998 |

OTHER PUBLICATIONS

Owen, F. C. "The DECT Radio Interface" IEE Colloquium On CT2/CA1 and Dect Cordless Telecommunications, pp. 1–6.

ETS 300 578, Mar. 1995, (GSM 5.08, Version 4.12.0) European digital cellular telecommunications system (Phase 2); Radio subsystem link control, pp. 8–37.

* cited by examiner

*Primary Examiner*—Nay Maung
*Assistant Examiner*—Alan T. Gantt
(74) *Attorney, Agent, or Firm*—Bell Boyd & Lloyd LLC

(57) ABSTRACT

The present invention is directed to a method and to a system for regulating the transmission power of a mobile station (2) of a mobile radiotelephone system in which information are transmitted in various carrier frequencies with a frequency hopping method. The fixed station (1) comprises a receiver (4) for receiving information that are transmitted from a mobile station (2). The fixed station (1) also comprises a detector (11) for detecting the transmission quality of the transmitted information. When the transmission quality is good and the information were transmitted with a high transmission power, a first message for lowering the transmission power is sent to the mobile station and, when the transmission quality is poor and the information were transmitted with a low transmission power, a second message for raising the transmission power is sent to the mobile station. The present invention serves the purpose of lowering the power consumption in a mobile station of a mobile radiotelephone system.

4 Claims, 4 Drawing Sheets

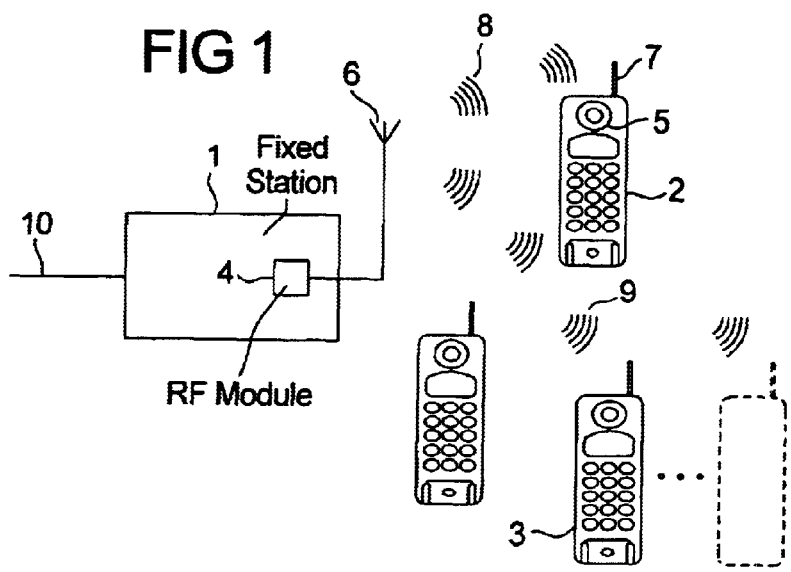
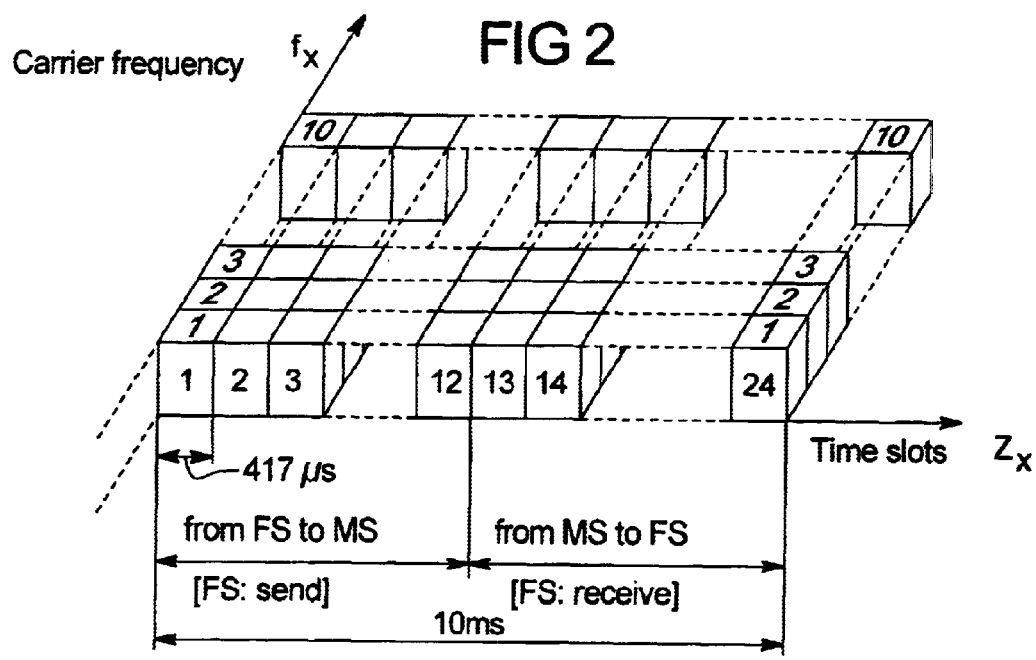

FIG 3

Carrier frequency $f_x$

RX1, RX2, RX3, TX1, TX2, TX3

Z1 | Z2 | Z3 | Z4 | Z5 | Z6 | Z7 | Z8 | Z9 | Z10 | Z11 | Z12

Time slots $Z_x$

Carrier frequency $f_x$

RX1, RX2, RX3, RX4, TX1, TX2, TX3, TX4

Z1 | Z2 | Z3 | Z4 | Z5 | Z6 | Z7 | Z8 | Z9 | Z10 | Z11 | Z12 | Z13 | Z14 | Z15 | Z16

Time slots $Z_x$

833µs, 417µs

10ms

METHOD AND SYSTEM FOR REGULATING THE TRANSMISSION POWER OF A MOBILE STATION OF A MOBILE RADIOTELEPHONE SYSTEM

BACKGROUND OF THE INVENTION

1. Field of the Invention

The present invention is directed to a method and to a system for regulating the transmission power of a mobile station of a mobile radiotelephone system in which information are transmitted in different carrier frequencies with a frequency hopping method.

2. Description of the Related Art

In order to replace the various analog and digital standards that exist in Europe, the DECT (digital enhanced cordless communication) standard was passed in the early '90's. It is the first common European standard for cordless telecommunication. A DECT network is a micro-cellular, digital mobile radiotelephone network for high subscriber densities and is mainly designed for use in buildings. Use of the DECT standard, however, is likewise possible outside of buildings. The capacity of the DECT network of about 10,000 subscribers per square kilometer makes the cordless standard into an ideal access technology for network operators. According to the DECT standard, the transmission of data signals is also possible in addition to the transmission of speech. Thus, cordless data networks can also be constructed on a DECT basis.

The DECT standard is explained in greater detail below with reference to FIG. 2. A digital, cordless telecommunication system was standardized for Europe under the name DECT. In combination with the switching function of a telecommunication system, this system is thus suitable for the mobile telephone and data traffic in an office building or on a corporate campus. The DECT functions supplement a telecommunication system and thus turn a switch into the fixed station FS of the cordless telecommunication system. Digital radio connections between the fixed station FS and the maximum of 120 mobile stations MS can thus be set up, monitored and controlled on up to 120 channels.

Transmission on a maximum often different carrier frequencies (carriers) is carried out in the frequency range of 1.88 GHz to 1.9 GHz. This frequency-division multiplex method is referred to as FDMA (frequency division multiple access).

Respectively twelve timeslots are transmitted in chronological succession in the uplink and in the downlink in the time-division multiplex method TDMA (time division multiple access) on each of the ten carrier frequencies. Thus 120 channels derive for the cordless telecommunication according to the DECT standard for ten carrier frequencies, each having twelve timeslots in the uplink and in the downlink. Since, for example, one channel is required for each voice connection, 120 connections to a maximum of 120 mobile stations MS derive. Alternating mode (duplex, TTD) is employed on the carriers. After twelve channels (channels 1–12) have been sent by the fixed station, it switches to reception and receives twelve channels (channels 13–24) from at least one mobile station in the opposite direction.

A time-division multiplex frame is thus composed of 24 channels (see FIG. 2). Channel 1 through channel 12 are transmitted from the fixed station FS to the mobile stations MS, whereas channel 13 through channel 24 are transmitted in the opposite direction from the mobile stations MS to the fixed station FS. The frame duration is 10 ms. 320 bits of information (for example, speech) and 104 bits of control data (e.g., synchronization, signalling and error monitoring data) are transmitted in this time. The payload bit rate for a subscriber (channel) derives from the 320 bits of information within 10 ms, which translate to 32 kilobits per second.

Integrated components that convert the DECT functions have been developed for fixed and mobile stations. The fixed station and the mobile station perform similar functions. One of the integrated modules is the RF module, i.e., the module that implements the actual function of receiving and transmitting in the RF range.

It is known to employ "fast hopping" RF modules, i.e., RF modules that can implement a change of the carrier frequency from one timeslot or, channel to the next. However, these fast hopping RF modules are very complex and expensive, so usually "slow hopping-RF modules are employed in practice, i.e., modules that require a certain time for changing the carrier frequency. In practice, the time span that the slow hopping RF module requires for the change of the carrier frequency essentially corresponds to the time span of a time slot. This means that an inactive time slot (blind slot) in which no data can be transmitted must follow each active time slot, i.e., each slot in which are transmitted. This means that only six connections can be implemented in practice on a carrier frequency in the DECT standard instead of the twelve connections that are possible.

A DECT channel is defined by its time slot and its carrier frequency. According to the DECT standard, the organization of the reemployment of physical channels ensues with a dynamic channel selection. A complicated frequency planning, as in cellular systems, is thus superfluous. For a connection setup, the signal levels of all channels are continuously measured and the malfunction-free channels are administered in a channel list (channel map). During a connection, the signal levels of all channels as well as the reception quality continue to be measured. When this monitoring shows that the channel employed at the moment was transmitted on a carrier frequency that was disturbed (due, for example, to the influence of a transmission on the same carrier frequency from or to a different fixed station), a different carrier frequency that is entered as disturbance-free in the in the channel list is automatically selected for the next active time slot.

As an alternative, a "frequency hopping" method in which the carrier frequency is changed after a predetermined time span, for example, one frame of the transmission, can also be employed.

For countries outside of Europe, the DECT standard may have to be modified and adapted to the local conditions. In the USA, for example, the transmission cannot ensue in the normal DECT range between 1.88 and 1.90 GHz; rather, the generally accessible 2.4 GHz ISM (industrial, scientific, medical) band is available. Furthermore, changes would have to be undertaken for adaptation to the national regulations such as the American rule FCC part 15 which describes the transmission methods, transmission powers and the available bandwidth allowed for the air interface.

In the DECT standard, each time slot contains another 104 bits required for the signal transmission in addition to the aforementioned 320 information bits as well as 56 bits of a guard field, so that each time slot contains a total of 480 bits, permitting a data rate of (24×480 bits)/10 ms=1,152,000 bits/s. This high data rate is not meaningful in the American ISM band since too great a bandwidth would be required per usable channel. Despite these rules, optimally unmodified component parts developed for the DECT standard such as the baseband controller should, for cost reasons, continue to be useable despite these rules.

Since, further, mobile stations are usually battery/storage cell-operated, the energy they consume during operation should be as low as possible in order to enable long operating times.

ETS 300 578: March 1995 (GSM 5.08 version 4.12.0) discloses a system in which a change of the transmission signal power of a mobile part is initiated by exceeding a upward or, downward limit of a signal level threshold by a plurality of values of a signal level measured by the base station as well as exceeding an upward or downward transgression of a quality threshold by a plurality of values of a quality parameter value measured by the base station.

For the mobile radio transmitter/receiver, particularly a mobile part, of a cordless telecommunication system according to German patent document DE 44 26 255 A1, the mobile part—regardless of a reception level evaluation by the base station—should be independently in the position to regulate the transmission power in order to reduce the power or, energy consumption, so that a maximally possible operating duration derives in the standby or active mode.

SUMMARY OF THE INVENTION

The object of the invention is to provide a method and system for regulating the transmission power of a mobile station of a mobile radiotelephone system. This object is achieved by a method for regulating transmission power of a mobile station of a mobile radiotelephone system in which information are transmitted in different carrier frequencies with a frequency hopping method, comprising the steps of: receiving information that are transmitted from a mobile station in a fixed station; detecting a transmission quality of the transmitted information in the fixed station, comprising the following steps in the DECT standard or a similar standard which utilizes a transmission unit having an A-field and an X-field: a) determining whether an error is present in the cyclically redundant bits of the A-field (A-CRC error); b) determining whether an error is present in the cyclically redundant bits of the X-field (X-CRC error); c) determining whether a data packet has been lost; and d) determining whether a value of a radio signal strength indicator (RSSI value) lies below a specific threshold; the method for regulating transmission power further comprising the steps of: transmitting a first message to the mobile station for lowering the transmission power when the determinations under steps (a)–(d) are all negative and the transmitted information were transmitted with a high transmission power; and transmitting a second message to the mobile station for raising the transmission power when one or more of the determinations under steps (a)–(d) are positive and the transmitted information were transmitted with a low power. The inventive method may also further comprise the steps of lowering, by the mobile station, its transmission power when it receives the first message; and raising, by the mobile station, its transmission power when it receives the second message.

This object is also achieved by a system for regulating transmission power of a mobile station of a mobile radiotelephone system in which information are transmitted in different carrier frequencies with a frequency hopping method, comprising: a mobile station; a fixed station, the fixed station comprising: a receiver fashioned such that information that are transmitted from the mobile station are received; a detector in the DECT standard or a similar standard which utilizes a transmission unit having an A-field and an X-field, the detector comprising: a) an A_CRC error determination mechanism fashioned such that an error in the cyclically redundant bits of the A-field is detected; b) an X-CRC error detection mechanism fashioned such that an error in the cyclically redundant bits of the X-field is detected; c) a packet loss determination mechanism fashioned such that a data packet that has been lost is detected; and d) a threshold determination mechanism fashioned such that exceeding a downward threshold of a value of a radio signal strength indicator is detected the fixed station further comprising: a transmitter fashioned such that a first message is transmitted to the mobile station for lowering the transmission power when all mechanisms (a)–(d) make a negative finding and the information were transmitted with a high transmission power, and a second message is transmitted to the mobile station for raising the transmission power when at least one of the mechanisms (a)–(d) makes a positive finding and the information were transmitted with a low transmission power. The mobile station may also comprise a mechanism for lowering its transmission power when it receives the first message and for raising its transmission power when it receives the second message.

The inventive method as well as the inventive system for the regulation of the transmission power of a mobile station are employed in a mobile radiotelephone system in which information are transmitted in different carrier frequencies with a frequency hopping method. The inventive system comprises a mechanism for receiving information transmitted from a mobile station in a fixed station. Additionally, a mechanism is provided for detecting the transmission quality of the transmitted information in the fixed station. When he transmission quality is good and the information were transmitted with a high transmission power, a first message for lowering the transmission power is transmitted to the mobile station. When the transmission quality is poor and the information were transmitted with a low transmission power, a second message for increasing the transmission power is transmitted to the mobile station. According to the present invention, the transmission power employed in the mobile station for the transmission of information to a fixed station is adapted dependent on the quality of the transmitted information. When the transmission quality is adequate, then a low transmission power can be employed in the mobile station, as a result of which the energy used in the mobile station can be considerably lowered.

The mobile station comprises mechanism for lowering the transmission power when it receives the first message and for increasing the transmission power when it receives the second message.

Advantageously, the mechanism for detecting the transmission quality of the transmitted information in the fixed station—when the mobile radiotelephone system is operated on the DECT standard or a similar standard—comprises mechanism for identifying whether an error is present in the cyclically redundant bits of the A-field (A-CRC error), mechanism for determining whether an error is present in the cyclically redundant bits of the X-field,(X-CRC error), mechanism for determining whether a data packet has been lost, and mechanism for determining whether the radio signal strength indicator (RSSI value) lies below a specific threshold.

When at least one of the mechanism makes a positive finding, the detection mechanism decides that the transmission quality is poor. When all of the mechanism make a negative finding, the detection mechanism determines that the transmission quality is good.

The high transmission power employed by the mobile station can, for example, be a maximum transmission power of a few hundred mW, whereas the low transmission power can, for example, be a few tens of mW.

BRIEF DESCRIPTION OF THE DRAWINGS

The invention shall now be explained in greater detail on the basis of an exemplary embodiment and with reference to the accompanying drawings.

FIG. 1 is a schematic diagram showing an arrangement for digital radio transmission of data;

FIG. 2 is a schematic timing illustration of the known DECT standard;

FIG. 3 a schematic illustration of the channel occupancy for the adaptation of the known DECT standard to the American ISM band; and FIG. 4 is a schematic timing illustration of an especially effective occupancy of the channels of the DECT standard adapted to the ISM band;

DESCRIPTION OF THE PREFERRED EMBODIMENTS

Figure 5:
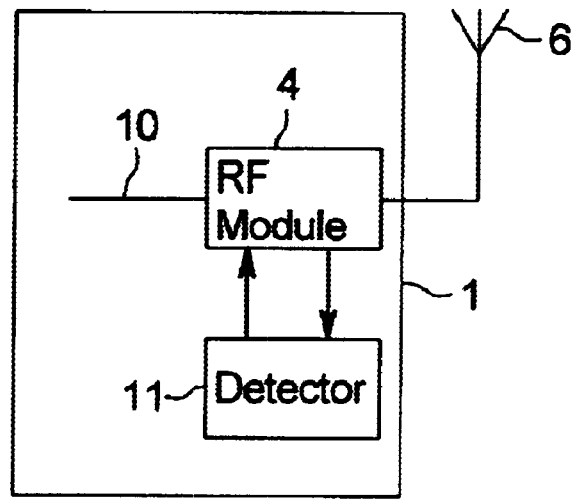
FIG. 5 is a block diagram illustrating an inventive fixed station.

An arrangement for the digital radio transmission of data is provided in FIG. 1. A fixed station 1 is connected to the fixed network with a terminal line 10. The fixed station 1 comprises an RF module 4 with which data can be transmitted or, received with an antenna 6. In particular, the RF module 4 can be slow-hopping RF module, i.e., an especially cost-beneficial RF module, but requires a certain time span for changing from one carrier frequency onto another carrier frequency. This time span lies on the order of magnitude of a time slot, i.e., between approximately 100 µs and 1 ms and, in particular, between approximately 300 µs and 500 µs. This time span required for changing the carrier frequency can, for example, correspond to the time span that is filled up by a time slot of a time-division multiplex method (TDMA). A radio transmission to a mobile station 2 can ensue with the antenna 6 via a radio transmission link 8 or, a radio transmission to a mobile station (cordless telephone) 3 can ensue with the antenna 6 via a second radio transmission link 9. All mobile stations shown in FIG. 1 have the same structure, so that the more detailed explanation below only references to the illustrated mobile station 2.

As can be seen in FIG. 1, this mobile station 2 comprises an antenna 7 for the reception or, for the transmission of data from or, respectively, to the fixed station 1. An RF module 5 that essentially corresponds to the RF module 4 employed in the fixed station is provided in the mobile station 2. The RF module 5 of the mobile station 2 can also be a slow-hopping RF module.

FIG. 3 illustrates how the known DECT standard can be adapted to the American ISM band in which the resulting data rate given a retention of the DECT standard would be too high for the ISM band. As can be seen from FIG. 3, the number of time slots per frame can be halved for this reason, i.e. only 12 time slots Z1–Z12 in which respectively 480 bits can be transmitted are provided in the ten milliseconds of a time frame instead of the 24 time slots (channels) of the DECT standard. By halving the number of time slots, the data rate is also halved to (12×480 bits)/10 ms=576000 bits/s. This lower data rate results in a bandwidth that is acceptable for the American ISM band.

As, however, can be seen from FIG. 3, slow-hopping RF modules must be provided given a cost-beneficial realization of the devices required for the radio transmission, which means that every active time slot in which data are transmitted must be followed by an inactive time slot (blind slot) in which no data can be transmitted. Given twelve provided time slots Z1–Z12 (6 time slots Z1–Z6 for the transmission from a fixed station to the mobile station and six time slots Z7–Z12 for the transmission from the mobile station to a fixed station), a maximum of only three possible connections are thus available. For a realization with the cost-beneficial slow-hopping RF modules, thus, the usable channel capacity is not very high due to the regimentation by the slow-hopping RF module to a maximum of three connections.

In FIG. 3, possible active time slots are shown hatched. For example, a transmission from the fixed station 1 to a mobile station 2, 3 can ensue (RX1) with the carrier frequency $f_2$ in the time slot Z1, as shown. When this time slot Z1 is followed by a time slot Z2 in which no data transmission occurs (an inactive-time slot, blind slot), a slow-hopping RF module can also use the time duration of the inactive time slot Z2 for changing the carrier frequency. As shown in FIG. 3, the carrier frequency can be changed, for example, from the carrier frequency $f_2$ to the carrier frequency $f_1$. As shown in FIG. 3, a transmission from the fixed station to a mobile station on the carrier frequency $f_1$, can thus ensue (RX2) in the time slot Z3. The pattern shown in FIG. 3 is thus characterized in that a active time slot (shown hatched) can be operated with each of the predetermined carrier frequencies ($f_1$, $f_2$, etc.) with the given time slot distribution.

According to the DECT standard, the organization of the reemployment of physical channels ensues with a dynamic channel selection, in which a channel is defined by its carrier frequency and its time slot. An involved frequency planning as in cellular systems can thus be omitted. For a connection setup, the signal levels of all channels are continuously measured, and the disturbance-free channels are administered in a channel list (channel map). During a connection, the signal levels of all channels of all possible carrier frequencies as well as the reception quality continue to be monitored.

When, as shown in FIG. 3, it is thus found in time slot Z1 in the transmission (RX1) on the carrier frequency $f_2$ that the reception or, transmission conditions on the carrier frequency $f_1$ are more favorable, a change can be made to the carrier frequency $f_1$ recognized as more favorable during the time duration of the time slot Z2 in which no data transmission occurs. The transmission RX2 during the time slot Z3 ensues on the carrier frequency $f_2$ found to be more favorable.

As preferred alternative to this approach in which a carrier frequency is changed only in case of a disturbance, a frequency hopping method (frequency hopping spread spectrum) can also be employed in which the carrier frequency is changed after a predetermined time span, for example a frame or a time slot of the transmission, regardless of whether the carrier frequency employed at the moment is disturbed or not. The beamed-out energy can thus be distributed over a plurality of carrier frequencies, which leads overall to a lower deterioration of other systems in transmitter range.

All carrier frequencies must be used equally often on average according to the rules of FCC part 15.

As already stated, the occupancy pattern for the channels shown in FIG. 3 has the disadvantage that, due to the halving of the number of time slots per frame to 12, as a result of which the duration of a time slot is doubled to 833 μs, and the resulting necessity of the inactive time slots after every active time slot, only three possible connections (three connections from a fixed station to a mobile station and three connections from a mobile station to a fixed station) are established compared to the six possible connections according to the DECT standard.

FIG. 4 shows a time slot structure that allows an increase of the maximally possible connections from three to four without the flexible selection of the carrier frequencies from one active time slot to the next active time slot being deteriorated or, without the programming of the synthesizers in the RF modules 4, 5 being deteriorated. As can be seen in FIG. 4, this increase of the maximum connections from three to four is essentially achieved in that the time duration of an inactive time slot during which no data transmission occurs is shortened compared to the time duration of an active time slot. As FIG. 4 shows, the time duration of an active time slot Z1, Z3, Z5, Z7, Z9, Z11, Z13 and Z15 of a time frame respectively amounts to 833 μs when the time frame amounts to 10 ms overall. The time duration of the inactive time slots Z2, Z4, Z6, Z8, Z10, Z12, Z14 and Z16, as shown in FIG. 4, only amounts to 417 μs and, thus, essentially only half the time duration of the active time slots. A slow-hopping RF module known from the DECT technology thus has an inactive time slot of 417 μs available to it following an active time slot in order implement a frequency programming for the carrier frequency of the following time slot. Half a time slot of the DECT standard adapted to the ISM band and having a time duration of 833 μs/2=417 μs thus suffices as inactive time slot (blind slot).

As can be seen from FIG. 4, for example, a data transmission RX1 during the time slot Z1 can ensue from the fixed station to a mobile station on a carrier frequency $f_1$. In order to also be able to implement the transmission with a smaller bandwidth, the time duration of the time slot Z1 is double the time duration according to the DECT standard, namely 833 μs. The time slot Z1 is followed by an inactive time slot Z2 whose time duration is only 417 μs. This time duration of only 417 μs is sufficient, however, for an RF module of the slow-hopping technology to program the carrier frequency for the following active time slot Z3. When it is thus recognized that, for example, the carrier frequency $f_3$ offers better reception conditions than the carrier frequency $f_1$, the change in carrier frequency from the carrier frequency $f_1$ of the time slot Z1 onto the carrier frequency $f_3$ for the time slot Z3 can ensue during the timer duration of the time slot Z2 in which no data transmission occurs, and, thus, a transmission from a fixed station to a mobile station can ensue (RX3) during the time slot Z3.

The illustrated example shows the case where the carrier frequency fx for the transmission between a fixed station and a specific mobile station is not changed.

Alternatively, a frequency hopping method can also be employed in which the carrier frequency is changed after a predetermined time span, for example, the time of a frame of the transmission.

After eight time slots Z1 through Z8, which corresponds to half the time slots Z1 through Z16 of a time frame of 10 ms, the transmission from the mobile station or stations to the fixed station ensues according to the duplex method (TDD). For example, a transmission (TX1) from a mobile station to the fixed station can ensue during the time slot Z9 with a carrier frequency $f_1$. The inactive time slot Z10 following the active time slot Z9 again comprises only half of the time duration—namely 417 μs—of the time duration of the active time slot Z9 (833 μs). The time duration of the inactive half time slot Z10 again suffices for the RF modules in order to undertake the frequency programming for the following active time slot Z11 for a further transmission (TX2) from a mobile station to the fixed station.

FIG. 5 schematically shows a fixed station 1 according to the present invention. The fixed station comprises an antenna 6 for the transmission and reception of information to or, respectively, from one or more mobile stations 2, as well as an RF module 4 that serves for modulating information onto or, respectively, demodulating information from carrier frequencies. The RF module is connected to the fixed network via a terminal line 10.

The fixed station 1 also comprises a detector 11 for detecting the transmission quality of the information transmitted from a mobile station. The detector 11 generates first message for lowering the transmission power when the transmission quality is good and the information were transmitted with a high transmission power. The detector 11 generates a second message for raising the transmission power of the mobile station when the transmission quality is poor and the information were transmitted with a low transmission power.

Figure 6:
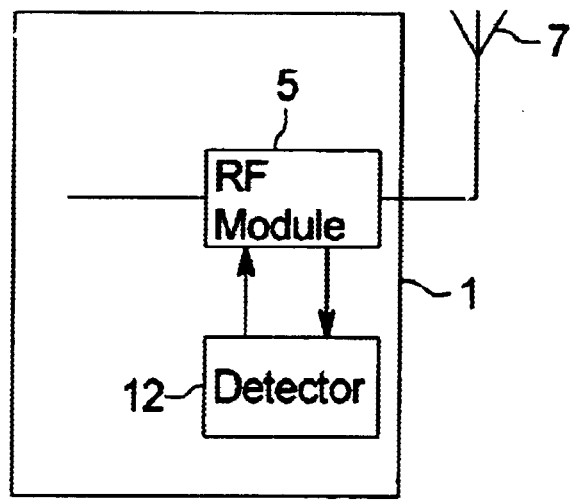
FIG. 6 is a block diagram illustrating an inventive mobile station.

At the beginning of a connection between a mobile station 2 and a fixed station 1, the mobile station, which comprises a schematic structure as shown by way of example in FIG. 6, transmits information to the fixed station 1 with a high transmission power via its RF module 5 and the antenna 7. Via the antenna 6 and the RF module 4, the fixed station receives the information received with a high transmission power. The detector 11, which is connected to the RF module 4, detects whether the transmission quality of the signals received from the mobile station 2 are good or poor. When the transmission quality is good, the detector 11 in the fixed station 1 generates a first message that is sent to the mobile station 2 via the RF module 4 and the antenna 6. The mobile station 2 receives the first message via its antenna 7 and the RF module 5. A detector 12, which is connected to the RF module 5, detects the first message in the mobile station 2 and lowers the transmission power. The information transmitted from the mobile station 2 to the fixed station are thus transmitted by the mobile station with a lower transmission power since the transmission channel enables a transmission of the information with a good quality.

When, at a later time, the detector 11 of the fixed station 1 detects that the information transmitted from the mobile station 2 with a low transmission power exhibit a poor transmission quality, then it generates a second message that is transmitted to the mobile station 2 via the RF module 4 and the antenna 6. The mobile station 2 receives the second message via its antenna 7 and the RF module 5. The detector 12 of the mobile station 2 detects the second message and correspondingly increases the transmission power in order to assure a transmission of information to the fixed station 1 with a corresponding quality.

At the beginning of the transmission, information are thus always transmitted from the mobile station 2 with high transmission power, for example, a few hundred mW. The low transmission power onto which a change is made given corresponding transmission quality can, for example, be few tens of mW.

The detector 11 for detecting the transmission quality of the information transmitted from the mobile station 2 in the fixed station determines the transmission quality on the basis of a number of criteria. These criteria are dependent on the standard on which the mobile radiotelephone system is based. When the inventive mobile radiotelephone system is based on the DECT standard or a similar standard, for example, for the transmission of information in the ISM band—as explained above the detector 11 comprises a mechanism for determining whether an error is present in the cyclically redundant bits of the A-field (A-CRC error), mechanism for determining whether an error is present in the cyclically redundant bits of the X-field (X-CRC, error), a mechanism for determining whether a data packet has been lost, and a mechanism for determining whether the radio signal strength indicator (RSSI value) lies below a specific threshold. When, for example, at least one of said means makes a positive finding, the detector 11 decides that the transmission quality is poor and generates the second message for raising the transmission power when the information were transmitted with a low transmission power. When all of the mechanism make a negative finding, the detector 11 decides that the transmission quality is good and generates the first message for lowering the transmission power of the mobile station if the information were transmitted with a high transmission power.

Figure 7:
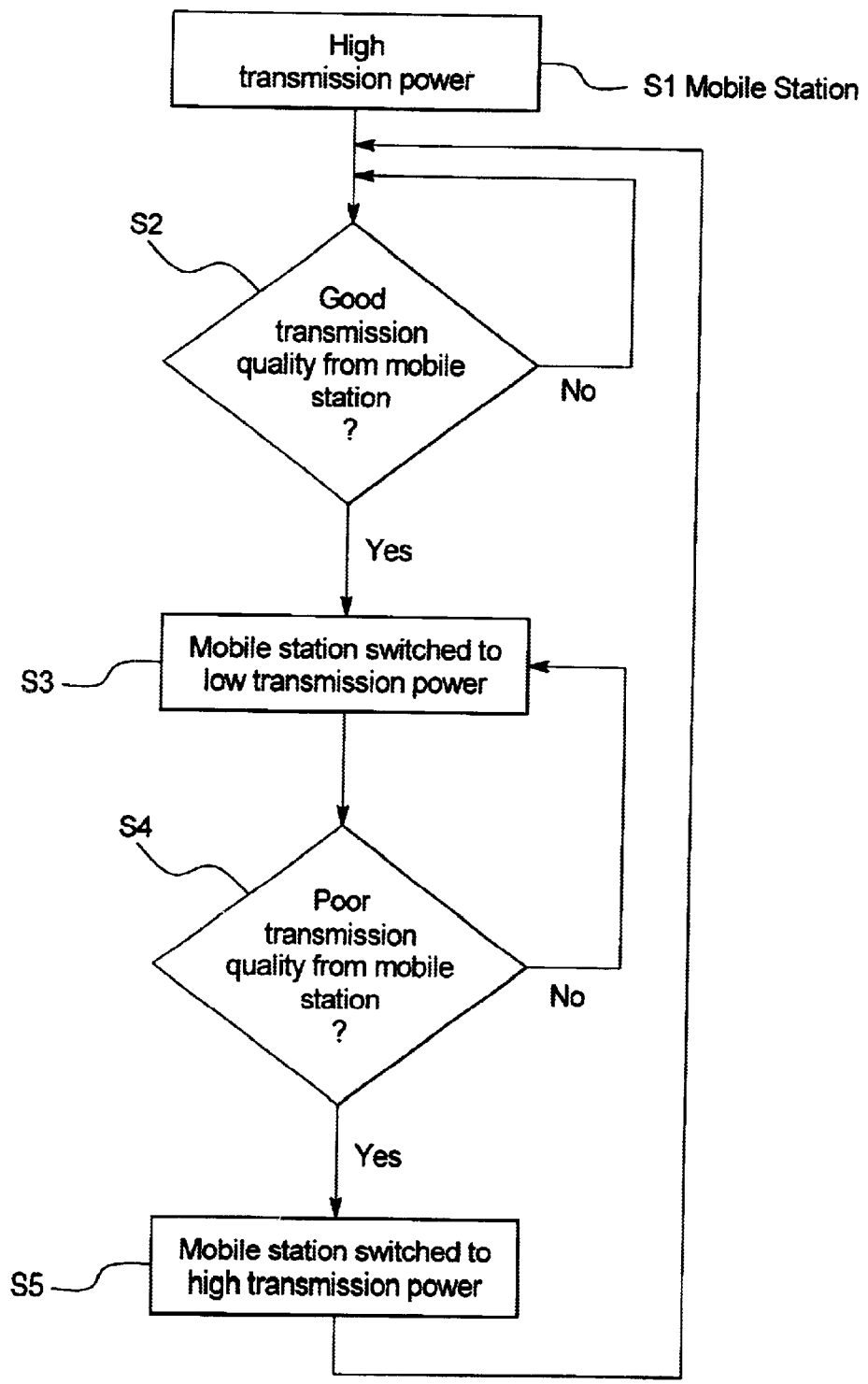
FIG. 7 is a flowchart of with the inventive method for regulating the transmission power of a mobile station.

FIG. 7 schematically shows the inventive method execution for regulating the transmission power of the mobile station 2 in a flowchart. In a first step S1, information are transmitted from the mobile station 2 to the fixed station 1 with a high transmission power. In a second step S2, an evaluation is made in the fixed station 1 as to whether the transmission quality of the information transmitted from the mobile station 2 is good. If not, the transmission power of the mobile station 2 is not changed, and the fixed station 1 continues to check the transmission quality of the information received from the mobile station 2 at regular intervals. When the fixed station 1 finds that the transmission quality is good, then the mobile station 2 is switched to low transmission power in the next step S3. This ensues with the first message generated by the fixed station 1 and communicated to the mobile station 2, this being received by the mobile station 2. In the next step S4, the fixed station 1 checks whether the information transmitted from the mobile station 2 with a low transmission power exhibit a poor transmission quality, if not, then nothing about the transmission power of the mobile station is changed and the mobile station continues to transmit information with a low transmission power. If the fixed station 1 finds that the information transmitted with a low transmission power have a poor transmission quality, then—in the next step S5—the transmission power of the mobile station 2 is switched back to the high transmission power. As was explained above, the fixed station 1 generates the first message for this purpose and communicates it to the mobile station 2. Since the mobile station subsequently again transmits information to the fixed station 1 with the high transmission power, the fixed station again starts detecting in step S2 whether the transmitted information have a good transmission quality.

The inventive method and the inventive system serve the purpose of reducing the energy consumption in the usually battery/storage cell-operated mobile stations of a mobile radiotelephone system.

The above-described method and system are illustrative of the principles of the present invention. Numerous modifications and adaptations thereof will be readily apparent to those skilled in this art without departing from the spirit and scope of the present invention.

What is claimed is:

1. A method for regulating transmission power of a mobile station of a mobile radiotelephone system wherein information are transmitted in different carrier frequencies with a frequency hopping method, comprising the following steps:

receiving at a fixed station information that is transmitted from a mobile station;

detecting a transmission quality of said transmitted information in said fixed station, comprising the following steps in the DECT standard or a similar standard which utilizes a transmission unit having an A-field and an X-field:
   a) determining whether an error is present in the cyclically redundant bits of said A-field;
   b) determining whether an error is present in the cyclically redundant bits of said X-field;
   c) determining whether a data packet has been lost; and
   d) determining whether a value of a radio signal strength indicator lies below a specific thresholds;

said method for regulating transmission power further comprising the steps of:
   transmitting a first message to said mobile station for lowering said transmission power when said determinations under steps (a)–(d) are all negative and said transmitted information were transmitted with a high transmission power; and
   transmitting a second message to said mobile station for raising said transmission power when one or more of said determinations under steps (a)–(d) are positive and said transmitted information were transmitted with a low power.

2. The method according to claim 1, further comprising the steps of:
   lowering, by said mobile station, its transmission power when it receives said first message and
   raising, by said mobile station, its transmission power when it receives said second message.

3. A system for regulating transmission power of a mobile station of a mobile radiotelephone system wherein information are transmitted in different carrier frequencies with a frequency hopping method, comprising:
   a mobile station;
   a fixed station, said fixed station comprising:
      a receiver fashioned such that information that are transmitted from said mobile station are received;
      a detector in the DECT standard or a similar standard which utilizes a transmission unit having an A-field and an X-field, said detector comprising:
         a) an A CRC error determination mechanism fashioned such that an error in the cyclically redundant bits of said A-field is detected;
         b) an X-CRC error detection mechanism fashioned such that an error in the cyclically redundant bits of said X-field is detected;
         c) a packet loss determination mechanism fashioned such that a data packet that has been lost is detected; and
         d) a threshold determination mechanism fashioned such that exceeding a downward threshold of a value of a radio signal strength indicator is detected;
   said fixed station further comprising:
   a transmitter fashioned such that a first message is transmitted to said mobile station for lowering said transmission power when all mechanisms (a)–(d) make a negative finding and said information were transmitted with a high transmission power, and a second message is transmitted to said mobile station for raising said transmission power when at least one of said mechanisms (a)–(d) makes a positive finding and said information were transmitted with a low transmission power.

4. The system according to claim 3, wherein said mobile station comprises a mechanism for lowering its transmission power when it receives said first message and for raising its transmission power when it receives said second message.

* * * * *